United States Patent [19]

Sydansk et al.

[11] 4,301,867
[45] Nov. 24, 1981

[54] PROCESS FOR SELECTIVELY REDUCING THE PERMEABILITY OF A SUBTERRANEAN SANDSTONE FORMATION

[75] Inventors: Robert D. Sydansk, Littleton, Colo.; Paul R. Gucwa, Houston, Tex.; Sharon A. Stonecipher, Littleton, Colo.

[73] Assignee: Marathon Oil Company, Findlay, Ohio

[21] Appl. No.: 164,617

[22] Filed: Jun. 30, 1980

[51] Int. Cl.$^3$ ............................................. E21B 33/138
[52] U.S. Cl. .................................... 166/292; 166/281; 166/300; 166/307
[58] Field of Search ............... 166/270, 273, 274, 275, 166/281, 292, 300, 305 R, 307; 405/263

[56] References Cited

U.S. PATENT DOCUMENTS

| | | | |
|---|---|---|---|
| 2,238,930 | 12/1937 | Chamberlain et al. | |
| 2,272,672 | 2/1942 | Kennedy | |
| 2,747,670 | 5/1956 | King et al. | |
| 3,530,937 | 9/1970 | Bernard | 166/270 |
| 3,756,315 | 9/1973 | Suman, Jr. et al. | 166/281 X |
| 3,805,893 | 4/1974 | Sarem | 166/270 |
| 3,827,495 | 8/1974 | Reed | 166/281 X |
| 3,860,070 | 1/1975 | Herce et al. | 166/292 |
| 3,871,452 | 3/1975 | Sarem | 166/270 |
| 4,026,360 | 5/1977 | Drinkard | 166/272 |
| 4,124,072 | 11/1978 | Redford | 166/270 |

FOREIGN PATENT DOCUMENTS

7111589  2/1973  Netherlands ..................... 166/292

OTHER PUBLICATIONS

Michell J. Sienko and Robert A. Plane, *Chemistry: Principles and Properties*, McGraw-Hill, Inc., 1966, p. 468.

*Primary Examiner*—Stephen J. Novosad
*Assistant Examiner*—George A. Suchfield
*Attorney, Agent, or Firm*—Jack L. Hummel

[57] ABSTRACT

A caustic aqueous solution having an amphoteric metal ion dissolved therein is injected into a subterranean sandstone formation wherein the caustic interacts with the sandstone formation to form caustic soluble silicates. The amphoteric metal ion reacts with the caustic soluble silicates to form an amphoteric metal silicate precipitate which preferentially reduces the permeability of the relatively highly permeable zones of the formation thereby improving conformance and flow profiles of fluids subsequently injected into or produced from the formation.

12 Claims, No Drawings

PROCESS FOR SELECTIVELY REDUCING THE PERMEABILITY OF A SUBTERRANEAN SANDSTONE FORMATION

DESCRIPTION

Technical Field

The invention relates to a process for selectively reducing the permeability of a subterranean sandstone formation to improve the conformance and flow profiles of subsequently injected or produced fluids, and more particularly, to a process for preferentially and predominantly reducing the permeability of relatively highly permeable zones of a subterranean hydrocarbon-bearing sandstone formation.

Background Art

In general, poor conformance of fluids injected into or produced from a subterranean formation occurs where the formation exhibits a lack of homogeneity. For example, cross-bedding between subterranean zones, beds, channels or vugs of varying permeabilities, or faults and folds may occur at a substantial distance away from the well bore. Fluid injected into or produced from a well penetrating the formation tends to preferentially channel or finger into areas of relatively high permeability, thus resulting in extremely poor conformance and flow profiles. Further exemplary, relatively highly permeable subterranean zones or beds may be vertically juxtaposed to subterranean zones or beds of relatively low permeability. Fluid injected into or produced from the subterranean hydrocarbon-bearing formation will preferentially flow through the zones or beds of relatively high permeability resulting in a relatively high residual hydrocarbon content in the remaining zones, beds, channels of vugs of relatively low permeability.

Several prior art processes have been proposed to alleviate preferential channeling or fingering, and thus, improve injection and production conformance and flow profiles. U.S. Pat. No. 2,272,673 to Kennedy discloses a process to diminish by-passing of gas through oil-depleted strata in subterranean oil producing zones which involves injecting an impregnating material into the oil-bearing stratum. The injected material preferentially locates in the by-passing channel, i.e., the most permeable strata, and as such, pressure loss due to by-passing is reduced in any subsequent gas flood. The impregnating material may be a solution of a salt, e.g. antimony or aluminum, sulfates or chlorides, which react with materials present in the rock strata, e.g. calcium carbonate, to form a precipitate. U.S. Pat. No. 2,238,930 to Chamberlain discloses a process wherein a metal salt solution is injected into a subterranean formation and brought into contact with an alkaline material to form a water insoluble precipitate. Examples of metal salts which may be utilized are antimony, chromium, zinc, aluminum, or lead salts. The formation itself may be alkaline, the formation waters may carry dissolved alkaline constituents, or an aqueous alkaline solution can be subsequently injected into the subterranean formation to precipitate the metal salt solution. A stabilizing agent is also introduced with the salt solution to prevent premature precipitation by retarding pH increase. U.S. Pat. No. 2,747,670 to King et al discloses a process for selectively reducing the permeability of the more highly permeable strata of a subterranean hydrocarbon-bearing formation wherein two aqueous solutions are successively injected into the formation, each solution containing a reactive component which will react to form a plugging precipitate when brought into contact with each other in the formation. An inert spacing fluid is injected between the two aqueous solutions. Water soluble salts of various metals, such as aluminum, lead, chromium and zinc, may be utilized in one solution while an alkali such as, sodium hydroxide or sodium carbonate can be utilized in the other solution. Where the formation contains mineral substances capable of reacting with either reactive component to form a precipitate, care is taken to avoid such precipitation. U.S. Pat. No. 3,530,937 to Bernard discloses a process similar to the King patent, wherein two solutions, each of which contain an agent which will react to form a plugging precipitate when brought into contact with each other, are injected into a subterranean hydrocarbon-bearing formation, interposed by an aqueous spacing medium. Examples of the two solutions are a solution of the water soluble salt, including aluminum, chromium, zinc, and lead, and an alkaline solution, such as sodium hydroxide or sodium silicate. U.S. Pat. Nos. 3,805,893 and 3,871,452 to Sarem involve processes which utilize the sequential injection of a dilute aqueous alkaline metal silicate solution, such as an aqueous solution of sodium and potassium orthosilicate, a spacer slug of relatively soft water, and an aqueous slug containing a reagent, such as, magnesium, calcium, aluminum, chromium, zinc, and lead, which will react with the alkaline alkali metal silicate. The orthosilicate and the reagent react at a location distant from the well bore to form a relatively insoluble precipitate. As these injection fluids tend to channel into areas of relatively high permeability, such precipitates tend to plug the highly permeable areas distant from the well bore, and thus, improve conformance flow profiles. U.S. Pat. No. 4,026,360 to Drinkard discloses a process wherein an oil shale reservoir is contacted by a relatively hot aqueous alkaline liquid that hydrothermally converts oil shale mineral components, such as dawsonite which contains aluminum, to particles of water-swellable, clay-like material. These particles are subsequently contacted with a relatively electrolyte-free aqueous liquid which swells the clay-like materials and reduces the permeability of earth formations within the flow path.

These proposed prior art processes have not proved altogether satisfactory. Several of these processes involve the use of an aqueous spacer between sequentially injected aqueous fluids. As these fluids preferentially channel or finger into the areas of relatively high permeability, the trailing fluid eventually penetrates the water spacer and reacts with the initially injected fluid or the connate water to form a plugging precipitate a substantial distance from the well bore. However, the channeling or fingering of sequentially injected fluids does not achieve maximum reaction of the reactive species contained in the sequentially injected fluids. As such, multiple applications of these prior art processes are required to achieve the desired degree of plugging within the more permeable zones of a subterranean strata. The second and subsequent applications are expensive, and relatively ineffective in reducing the permeability of more permeable zones, because subsequently injected fluids are diverted by the precipitate resulting from the first application into less permeable zones. Still other proposed prior art processes utilize reactants contained in the formation to react with an injected fluid so as to form a plugging precipitate. Often, however, these in situ reactants are not predominantly located within the more permeable zones of the subterranean formation or inadequate quantities thereof are contained within the more permeable zones resulting in the formation of inadequate precipitates therein. Thus the need exists for a process for selectively reducing the permeability of the more permeable zones of the subterranean formation which is efficient in a single application or treatment.

DISCLOSURE OF INVENTION

The present invention provides a process for improving injection and production conformance and flow profiles in a subterranean sandstone formation. A caustic aqueous solution having an amphoteric metal ion dissolved therein is injected into a subterranean hydrocarbon-bearing sandstone formation to form caustic soluble silicates. The amphoteric metal ion reacts with the caustic soluble silicates to form an amphoteric metal silicate precipitate which preferentially reduces the permeability of the relatively highly permeable zones of the sandstone formation. Zone isolation can be employed to selectively reduce the permeability of a highly permeable zone within the sandstone formation. The process can also be practised without zone isolation.

BEST MODE FOR CARRYING OUT THE INVENTION

In accordance with the present invention, a caustic aqueous solution containing an amphoteric metal ion is injected into a subterranean hydrocarbon-bearing sandstone formation and predominantly enters and penetrates the more permeable zone(s) of the formation. The caustic solution reacts with the sandstone and dissolves significant quantities of sandstone generating caustic soluble silicates in the more permeable zone(s). As utilized throughout this description, "caustic soluble" silicates encompass silicates which are soluble in caustic aqueous medium. Thereupon, the amphoteric metal ion contained in the injected aqueous solution reacts with the generated caustic soluble silicates to form an amphoteric metal silicate precipitate. This precipitate is preferentially formed in, and hence reduces permeability in the zones of relatively high permeability within a subterranean sandstone formation resulting in improved conformance and flow profiles for fluids injected into or produced from the sandstone formation. While it is not completely understood exactly why the injected caustic solution of the present invention forms silicates, it is believed that under formation temperatures the caustic attacks silicate minerals present in the sandstone and over a period of time results in the formation of caustic soluble silicates which eventually can precipitate as a silicate precipitate. However, the amphoteric metal ion present in the injected caustic solution reacts with the caustic soluble silicates in a relatively fast manner to form a different precipitate. The amphoteric metal ion advantageously modifies the properties of the silicate precipitate, i.e. modifies the chemical composition, the density, hydration and flocculation properties of the precipitate, to form an improved silicate precipitate which preferentially reduces the permeability of the more highly permeable subterranean zones.

The caustic utilized in the aqueous solution of the present invention may be any hydroxide ion generating compound, such as, sodium hydroxide, potassium hydroxide, lithium hydroxide or ammonium hydroxide, although sodium hydroxide is preferred for purposes of the present invention. The amphoteric metal ion which is employed in the aqueous solution of the present invention can be any amphoteric metal ion which manifests both acidic and basic properties. Thus, aluminum, trivalent chromium, zinc, divalent tin, lead, or antimony can be employed in the aqueous solution, preferably as a hydroxide. The amphoteric metal ion can be incorporated into the aqueous solution as any compound which can be readily dissolved in the aqueous caustic medium, such as, a salt, for example, aluminum chloride.

The initial caustic concentration of the injected aqueous solution is in excess of that stoichiometrically required to permit the amphoteric metal ions to be soluble in the caustic, aqueous solution. As such, amphoteric metal ions are incorporated into the caustic, aqueous solution in an amount to provide an excess of free hydroxide ion concentration. It is also important to note that caustic can be consumed in peripheral reactions in situ, depending on the mineralogy and litholog of the sandstone formation. For example, any dissolved cations, such as calcium, or minerals, such as, gypsum anhydrite and siderite, will consume caustic and thus, impede caustic-sandstone interaction. Therefore, the caustic concentration must also be sufficient to neutralize any such deleterious cations and/or minerals present in the sandstone formation and to form the amount of precipitate desired. A soft water or brine preflush can be injected into the sandstone formation prior to practicing the present invention to remove deleterious dissolved cations from the zone(s) to be treated.

The process of the present invention can be utilized to treat the near or far well bore environment of a subterranean sandstone formation. As utilized throughout this description, the term "near well bore" denotes the area of a subterranean formation surrounding a well bore penetrating the same which exhibits relatively homogeneous horizontal characteristics and wherein mixing between sequentially injected fluids separated by an aqueous spacer will not readily occur to any substantial degree. Such mixing is dependent upon, inter alia, the volume of the aqueous spacer, the characteristics of the formation (i.e. the number of pore channels present in the formation, geometry of the pores and pore throats of the formation and the permeability of the formation), the characteristics of each injected fluid (e.g. the diffusion characteristics of each fluid, the viscosities of each fluid, the concentrations of reactive species in each fluid, and the relative mobilities of each injected fluid), and the injection rates of each injected fluid). Given such dependency, the degree of mixing which will occur at a desired distance from a well bore penetrating a formation can be determined by the skilled artisan. As a general guide, the near well bore environment usually extends a radial distance into the formation of up to about 3 meters from the well bore, and may extend up to about 9 meters or more. Further, "far well bore" denotes the remaining area of a subterranean formation surrounding a well bore penetrating the formation.

For near well bore application, the volume of the caustic solution containing the amphoteric metal ion injected into the well bore environment is dictated by the depth of treatment desired. Once the depth is determined, the volume of the caustic solution injected is approximately equal to or greater than the pore volume of the portion of the near well bore environment to be treated minus the volume of the residual oil in place. The volume of the caustic injected is important to near well bore treatment since the injected volume dictates the depth of plugging and thus flow reduction achieved thereby. For far well bore application, the volume of caustic solution injected is not as important to the process of the present invention, as the caustic solution is injected without shutting in the well, and thus, reacts throughout the more permeable zone(s) of the sandstone formation until consumed. A given volume of injected caustic can be transported by a subsequently injected fluid, with or without a spacer slug, to locations distant from the well bore.

The amount of interaction between the injected caustic and the formation sandstone is dependent upon, inter alia, the sandstone mineralogy and lithology, the surface area of the sandstone formation, the formation temperature, the caustic concentration injected, and the residence time of the injected caustic. Although any subterranean sandstone formation can be treated by the process of the present invention, it is preferred to treat a sandstone formation having a temperature of at least 65° C., and more preferably of at least 75° C. When the process of the present invention is utilized to treat the near well bore environment, it is critical that the injected caustic is allowed adequate contact time within the portion of the near well bore environment treated to interact with sandstone, preferably by employing a soak period. The exact residence time of the injected caustic within the formation may vary widely from an hour up to 5 days or more. However, a soak period of about 16 to about 24 hours is often sufficient. In contrast, when the process of the present invention is utilized to treat the far well bore environment, the caustic solution containing amphoteric metal ions can be injected continuously without utilizing a soak period.

By utilizing the process of the present invention, the permeability of the relatively highly permeable zones of a subterranean hydrocarbon-bearing sandstone formation may be predictably reduced over a relatively wide permeability range. The process of the present invention is preferentially employed to improve vertical conformance and flow profiles in the near or far well bore environment of a subterranean hydrocarbon-bearing sandstone formation utilizing mechanical zone isolation, i.e. isolating selected relatively highly permeable zone(s) in a formation utilizing conventional packer assemblies and selectively treating these highly permeable zones. The following example is illustrative of the application of the process of the present invention with zone isolation and is not to be construed as limiting the scope thereof.

EXAMPLE 1

A 7.6 cm×2.5 cm diameter linear, unfired, homogeneous Berea sandstone plug having an initial permeability of 300 md is injected with a 15 wt. % NaOH solution, having 5 wt. % of aluminum sulfate dissolved therein. The injected fluid and the plug are maintained at 85° C., by a heat exchanger. The fluid permeability of the plug after this sequential injection treatment is measured and compared with the initial permeability ($k_{final}/k_{initial}$). The permeability reduction achieved by this treatment should be sufficiently large to significantly improve vertical conformance of injected or produced fluids.

The aforedescribed example indicates that the process of the present invention can be employed to achieve permeability reduction in relatively highly permeable zone(s) of a subterranean sandstone formation utilizing mechanical zone isolation. The process of the present invention can also be applied without zone isolation to preferentially and predominantly reduce permeability and aqueous mobility in relatively highly permeable subterranean zones which are vertically juxtaposed to zones of relatively low permeability. The following example is illustrative of the application of the process of the present invention without zone isolation, and is not to be construed as limiting the scope thereof.

EXAMPLE 2

Sequential injections are conducted in parallel utilizing 2.5 cm×2.5 cm diameter homogeneous sandstone plugs from an Oligocene aged reservoir, one plug having a relatively high permeability, the other a relatively low permeability. The plugs are injected in parallel with approximately one half pore volume 15 wt. % NaOH having 5 wt. % of aluminum sulfate dissolved therein and are allowed to soak for 24 hours. The injected fluid and both plugs are maintained at 85° C. by heat exchangers. The fluid permeability of each plug is measured immediately after fluid injection and at selected intervals thereafter. These subsequent measurements account for any settling of the precipitate which occurs after the formation thereof. The permeability of the relatively high permeability plug should be preferentially and predominantly reduced by application of the process of the present invention. As such, the ratio of the permeability of the high permeability plug to the permeability of the low permeability plug should be significantly reduced, thus, improving the vertical conformance and flow profiles of subsequently injected and produced fluids.

The process of the present invention is highly efficient in forming a plugging precipitate in situ, since both the caustic and the amphoteric metal ion are injected into a subterranean sandstone formation in one solution. When the caustic interacts with the sandstone formation to form a caustic soluble silicate, substantially all of the amphoteric metal ion present in the solution reacts with the silicates to form amphoteric metal silicate precipitates. Thus, the inefficiencies inherent in relying on fingering or channeling of sequentially injected fluids to mix reactive species dissolved therein are obviated by the present invention.

While the foregoing preferred embodiment of the invention has been described and shown, it is understood that all alternatives and modifications, such as those suggested, and others may be made thereto, and fall within the scope of the invention.

We claim:

1. A process for improving conformance and flow profiles of fluids injected into or produced from a subterranean sandstone formation having at least one zone of relatively high permeability and at least one zone of relatively low permeability, the formation being penetrated by a well bore in fluid communication therewith, the process comprising:

injecting into a portion of the sandstone formation via said well bore a caustic aqueous solution having an amphoteric metal dissolved therein and having an initial caustic concentration in excess of that stoichiometrically required to permit said amphoteric metal to be soluble in said caustic aqueous solution, said caustic interacting with said sandstone formation to form soluble silicate groups, said amphoteric metal reacting with at least a portion of said silicates to form an insoluble amphoteric metal silicate precipitate, the insoluble precipitate being preferentially and predominantly formed within said at least one zone of relatively high permeability, said precipitate predominantly and preferentially reducing the permeability of said at least one zone of relatively high permeability.

2. The process of claim 1 wherein said caustic is sodium hydroxide.

3. The process of claim 2 wherein said amphoteric metal is selected from the group consisting of aluminum, trivalent chromium, zinc, divalent tin, lead, antimony, or mixtures thereof.

4. The process of claim 1 wherein said subterranean sandstone formation is a subterranean hydrocarbon-bearing sandstone formation.

5. The process of claim 1 wherein said subterranean sandstone formation has a near well bore environment which exhibits relatively homogeneous horizontal properties and said caustic aqueous solution is exclusively injected into the near well bore environment, the process further comprising:
shutting in said well bore for a period of time sufficient to allow said soluble silicates to be formed within said near well bore environment, said insoluble precipitate being preferentially and predominantly formed within said at least one zone of relatively high permeability in said near well bore environment.

6. The process of claim 5 wherein the volume of said caustic aqueous solution which is injected into the sandstone formation is about equal to the pore volume of the portion of the sandstone formation treated minus the volume of the residual oil contained in said portion.

7. A process for improving conformance and flow profiles of fluids injected into or produced from a subterranean sandstone formation having a zone of relatively high permeability and a vertically juxtaposed zone of relatively low permeability, the sandstone formation being penetrated by a well bore in fluid communication therewith, the process comprising:
injecting via said well bore into said zone of relatively high permeability a caustic aqueous solution having an amphoteric metal dissolved therein and having an initial caustic concentration in excess of that stoichiometrically required to permit said amphoteric metal to be soluble in said caustic aqueous solution, said caustic interacting with said sandstone formation to form soluble silicates, said amphoteric metal reacting with said at least a portion of the silicates to form an insoluble amphoteric metal silicate precipitate, the insoluble precipitate being formed within said zone of relatively high permeability, said insoluble precipitate reducing the permeability of said zone of relatively high permeability and reducing the ratio of the permeability of said zone of relatively high permeability to the permeability of said zone of relatively low permeability.

8. The process of claim 7 wherein said caustic is sodium hydroxide.

9. The process of claim 8 wherein said amphoteric metal ion is selected from the group consisting of aluminum, trivalent chromium, zinc, divalent tin, lead, antimony, or mixtures thereof.

10. The process of claim 7 wherein said subterranean sandstone formation is a subterranean hydrocarbon-bearing sandstone formation.

11. The process of claim 7 wherein said subterranean sandstone formation has a near well bore environment which exhibits relatively homogeneous horizontal properties, the process further comprising:
shutting in said well bore for a period of time sufficient to allow said soluble silicates to be formed within said near well bore environment, said insoluble precipitate being formed within said zone of relatively high permeability in said near well bore environment.

12. The process of claim 11 wherein the volume of said caustic aqueous solution which is injected into said zone of relatively high permeability is about equal to the pore volume of said zone of relatively high permeability minus the volume of residual oil contained in said zone of relatively high permeability.

* * * * *